United States Patent [19]
Boesch et al.

[11] Patent Number: 5,721,528
[45] Date of Patent: Feb. 24, 1998

[54] LOW TIRE WARNING SYSTEM

[75] Inventors: Mathew Alan Boesch, Plymouth; Douglas Scott Rhode, Farmington Hills, both of Mich.

[73] Assignee: Ford Global Technologies, Inc., Dearborn, Mich.

[21] Appl. No.: 772,642

[22] Filed: Dec. 23, 1996

[51] Int. Cl.$^6$ ............................................. B60C 23/00
[52] U.S. Cl. ..................... 340/442; 340/444; 73/146.2; 73/146.5; 116/34 R; 200/61.22; 364/565; 364/424.034
[58] Field of Search ...................... 340/442, 444, 340/445, 446, 447, 448; 73/146.2, 146.3, 146.4, 146.5; 116/34 R; 200/61.22; 364/565, 424.034

[56] References Cited

U.S. PATENT DOCUMENTS

| | | |
|---|---|---|
| 3,526,873 | 9/1970 | Burt . |
| 3,613,075 | 10/1971 | Griffiths et al. . |
| 3,691,524 | 9/1972 | Frost et al. . |
| 4,149,140 | 4/1979 | Evans et al. . |
| 4,458,535 | 7/1984 | Juergens . |
| 4,567,460 | 1/1986 | Gebler . |
| 4,574,267 | 3/1986 | Jones et al. . |
| 4,777,611 | 10/1988 | Tashiro et al. . |
| 4,876,528 | 10/1989 | Walker et al. . |
| 5,192,929 | 3/1993 | Walker et al. . |
| 5,218,862 | 6/1993 | Hurrell et al. . |
| 5,239,469 | 8/1993 | Walker et al. . |
| 5,248,957 | 9/1993 | Walker et al. ............... 340/444 |
| 5,252,946 | 10/1993 | Walker et al. . |
| 5,343,741 | 9/1994 | Nishihara et al. . |
| 5,345,217 | 9/1994 | Prottey . |
| 5,442,331 | 8/1995 | Kishimoto et al. . |
| 5,483,220 | 1/1996 | Kushimoto et al. ............. 340/444 |
| 5,497,657 | 3/1996 | Taguchi et al. . |
| 5,513,523 | 5/1996 | Sekiya et al. . |
| 5,524,482 | 6/1996 | Kushimoto et al. .............. 73/146.3 |
| 5,541,573 | 7/1996 | Jones . |
| 5,552,760 | 9/1996 | Jones ................................ 340/444 |
| 5,569,848 | 10/1996 | Sharp ............................... 73/146.2 |
| 5,578,984 | 11/1996 | Nakajima ....................... 340/444 |
| 5,589,815 | 12/1996 | Nishihara et al. ............... 340/444 |
| 5,604,307 | 2/1997 | Iida et al. ........................ 73/146.2 |
| 5,629,478 | 5/1997 | Nakajima et al. ............... 73/146.2 |

OTHER PUBLICATIONS

Kevin Jost, "1997 Pontiac Grank Prix sedan", *Automotive Engineering*, Apr. 1996, pp. 65–66 1995 Japan Market Mitsubishi Diamante, Service Manual, Translated.

*Primary Examiner*—Jeffrey Hofsass
*Assistant Examiner*—Nina Tong
*Attorney, Agent, or Firm*—Paul K. Godwin

[57] ABSTRACT

A system and method that monitors four wheel sensors of an automotive vehicle to determined changes in the effective rolling radii of any wheel and a low pressure tire condition. Certain vehicle operating conditions, such as excessive or very low speeds, braking, and turns, are determined from the sensor outputs and are used to prevent erroneous detection of changes in effective rolling radii. Data from the sensors that is determined to be acceptable is accumulated over time as displacement values for each wheel. When the displacement values exceed a predetermined value, a metric function is used to compare differences detected in accumulated displacement values for the front pair of wheels and for the rear pair of wheels. If the difference between compared pairs of wheels is excessive, as compared with a predetermined baseline metric value, a low tire condition is detected. Further accumulation of instances where the metric indicates a detected condition, provides confidence that the condition actually exists and a warning is provided to the vehicle operator. Resetting of the system and the baseline metric is performed when the low tire condition is corrected or when the tires are checked and properly inflated.

14 Claims, 5 Drawing Sheets

LOW TIRE WARNING SYSTEM

BACKGROUND OF THE INVENTION

This invention relates to the field of low tire pressure warning systems for automotive vehicles and more specifically to a warning system that derives information for determining when any particular pneumatic tire is low by monitoring the angular rotation of each wheel.

Several low tire detection systems have been described in the literature, including those that monitor tire pressure and profile height. More recent systems have been described which utilize effective rolling radius calculations to determine when the radius of one of the wheels varies. The generally employed principle of using the effective rolling radius relies on the fact that a wheel with a flat or low pressure tire has an incrementally smaller effective rolling radius than a nominally inflated tire. Often, wheel displacement sensors are used to measure the angular displacement of each wheel. Each of these measurements are related to the effective rolling radius. In this context, the effective rolling radius is defined as the ratio of the true forward distance traveled by the center of a wheel divided by the angular displacement measured over this distance.

A problem with relying on the effective rolling radius of a radial construction tire is that its radius is only weakly dependent on tire pressure. The large "hoop tension" in the tire belt keeps the tire rolling radius almost constant with respect to tire inflation. For example, tests indicate that a tire inflated to only 5 psi will have a rolling radius approximately 0.9% smaller than if it were inflated to its nominal pressure, 30 psi. However, very accurate measurement of rolling radius has become economically feasible due to the enhanced dynamic range of modern 16-bit microprocessors commonly used in Anti-lock Braking Systems (ABS) and which read the wheel revolution sensors.

Another challenge in detecting low tire pressure is that some tire characteristics have a larger influence upon wheel effective rolling radius than inflation pressure. Tire-to-tire manufacturing tolerances typically vary the effective rolling radius by up to 1.2%. Also, during the tire break-in period, approximately the first 100 miles, effective rolling radius typically can change up to 0.6%. Tread wear also significantly changes the effective rolling radius over the tire lifetime, typically up to 3.6%.

Vehicle operating conditions will also cause significant changes to the effective rolling radius. These conditions are those which cause wheel slippage, those related to the use of a "space-saver" spare tire, and those related to speed. Generally speaking, any maneuver which causes even slight to moderate wheel slippage will cause the effective rolling radius to change by an amount greater than that to be caused by pressure variation alone. Such maneuvers include accelerating, decelerating using brakes, steering through sharp turns, and any combinations of these.

There also are other vehicle operating conditions which influence wheel effective rolling radius in a way not related to tire slippage. These include vehicle operation with a space-saver spare tire, and vehicle operation at very high or very low speeds. The smaller space-saver spare tire has an effective rolling radius that may differ significantly (e.g. 10%) from the other wheels. However, in some performance cars with large diameter brakes, corresponding large diameter wheels, and low profile tires, the use of a space saver spare wheel and tire which is narrow, may have essentially the same effective rolling radius as the other wheels. Differentiating this spare from the other wheels is very difficult in this situation, and the space-saver might be misinterpreted as a low tire.

Vehicle operation at very high speeds, (e.g. 100 mph or above), will cause high centrifugal forces in the wheels which can tension the perimeters of the tires in such a way that a low tire will take on the same or larger effective rolling radius as a nominally inflated tire.

Vehicle operation at very low speeds (e.g. less than 6 mph or 10 kph) also poses several problems for effective rolling radius based systems. One is the increased likelihood of wheel slip due to acceleration, deceleration, and steering. This is because low speed operation is not a sustained operating point, but a transitional one during which the car is decelerating to stop, accelerating to normal driving speeds, or steering through sharp turns and corners. Also at low speeds, the wheel rotation sensors' signals drop to a very low amplitude level and become noisy or non-existent. This loss of signal at low speed is a characteristic of current level wheel rotation sensor technology.

SUMMARY OF THE INVENTION

The present invention is employed on a four wheeled automotive vehicle to detect the occurrence of a flat or low tire inflation and to provide a warning to the vehicle operator. The invention utilizes four wheel displacement sensors already in place on vehicles that include ABS systems. A processor module also is employed and either may be a subcomponent of the ABS control module or a unique electronic module. A warning device notifies the vehicle operator when a low tire problem is detected, and a reset switching means is included, which allows the driver or tire mechanic to clear the low tire warning.

The principle of operation is based on the fact that a wheel with a flat or low pressure tire has an incrementally smaller effective rolling radius than a nominally inflated tire. In this invention, wheel displacement sensors measure the angular displacement of each wheel. That measurement is related to each wheel's effective rolling radius (i.e., the ratio of the true forward distance traveled by the center of the wheel divided by the angular displacement over this distance).

A novel aspect of the present invention is a metric which combines the measured wheel displacements in a way which indicates over time the variation of the wheels' effective rolling radii, which in turn reflects the tire pressure condition. Particular fore/aft vehicle asymmetries are taken into account by the metric to accommodate for vehicle front/rear weight differences, front/rear wheel torque differences, and front/rear tire differences and therefore avoid erroneous indications of a low tire condition. The metric is an algebraic expression which combines wheel displacements in such a way that the result value is indicative of tire pressure conditions.

The metric is enabled when the vehicle operates above a minimum speed and below a maximum speed, and below maximum absolute values of both longitudinal and lateral accelerations. This prevents the tire warning system from considering measurements taken when the tires may be slipping on the roadway or subjected to the high and low speed characteristics mentioned above. Unlike some prior art algorithms proposed for flat or low tire warning based upon wheel revolutions, this metric is enabled during vehicle steering, as long as the other conditions on speed and acceleration are met.

In the present invention, the methodology partitions the vehicle fore/aft in order to make an estimation of true vehicle forward progress (i.e., the front forward progress and rear forward progress are separately estimated). This approach overcomes the effect of the following three attributes that otherwise may influence accurate determinations of low tire occurrences:

1. The vehicle weight distribution is typically more consistent side-to-side than front-to-rear. A fore/aft partitioning tends to reduce the effect of front/rear weight differences on effective rolling radius. This makes the metric calculation more reliable.
2. In front wheel drive and rear wheel drive vehicles, longitudinal tire forces (acceleration and braking) will affect the front and rear true forward progress estimates differently. Partitioning makes the calculated metric more immune to the effects of longitudinal tire forces.
3. It is more likely that tires with different characteristics (new or from a different manufacturer or of different sizes) will be used on the front or rear of the vehicle rather than from side-to-side. Therefore, fore/aft partitioning tends to group tires with like characteristics.

The described method uses the estimated true front forward progress and true rear forward progress to generate a low tire signal, called "the metric". The metric is compared to a predetermined "baseline" metric value which represents the particular car's tire-to-tire differences not related to pressure. If the difference between current metric value and baseline metric value is larger than a threshold, which is fine-tuned for this vehicle type and tire type, at least one tire is perceived to be low.

Because warning the driver about a low tire is distracting, the algorithm first builds confidence by requiring that a low tire is repeatably indicated by the metric. For this purpose, a "confidence filter" is provided. The confidence filter output is a single number which represents the consistency of a collection of repeated low tire metric evaluations. The confidence number increases each time that the metric indicates low pressure, and decreases each time that it indicates no low tire problems. When the confidence number exceeds a predetermined threshold, a signal is generated and the driver is warned. The amount by which the confidence filter is incremented may differ from that by which it is decremented. The fine-tuning of the increments and decrements for a vehicle type and tire type allow a trade-off between low tire warning response time and low tire warning accuracy. Also, the increment and decrement size can be made dependent on vehicle operating conditions such as speed, acceleration, road roughness, steering, etc., as perceived by the wheel rotations.

DETAILED DESCRIPTION OF THE PREFERRED EMBODIMENT

Figure 1:
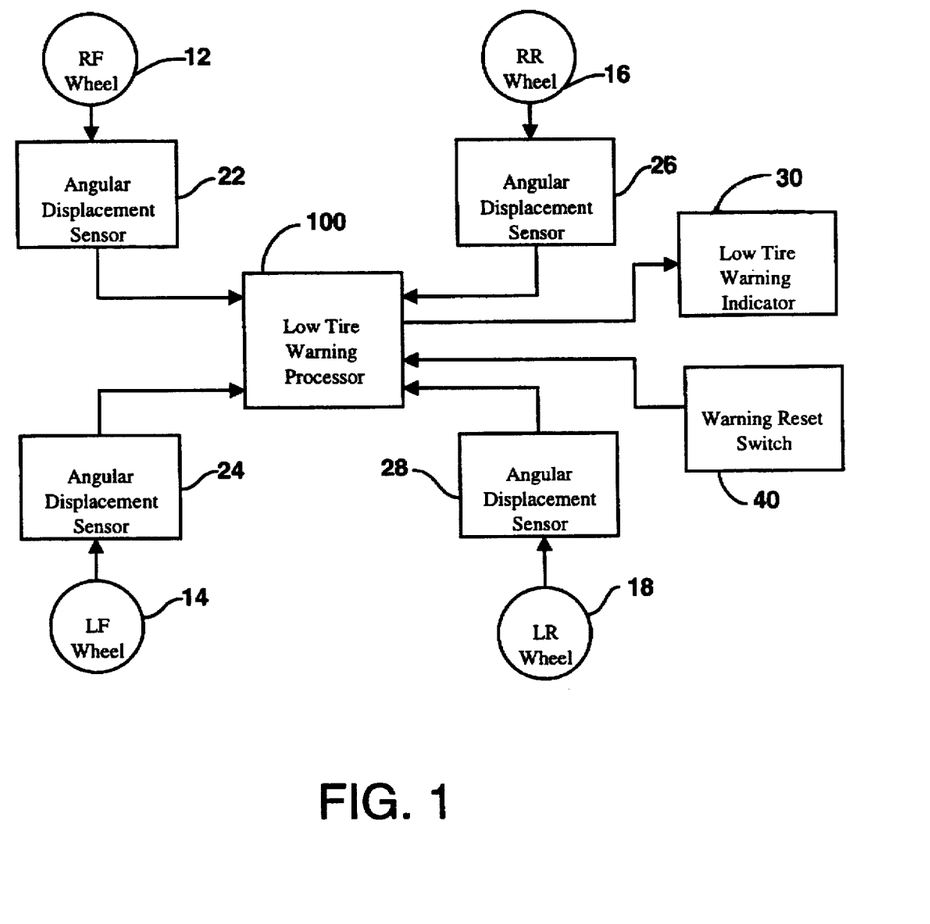
FIG. 1 is an overall architecture diagram showing the hardware used for the low tire warning system of the present invention.

A typical hardware arrangement is shown in FIG. 1. Here, the right front, the left front, the right rear and left rear wheels are represented as 12, 14, 16 and 18, respectively. The rotation of those wheels are sensed by corresponding angular displacement sensors 22, 24, 26 and 28. Each sensor outputs a variable frequency signal which is directly related to the rotational speed of the wheel and the number of teeth (typically 50) on the sensor. The rotation signals are then input to a low tire warning processor 100. Processor 100 repetitively executes an algorithm which evaluates the wheel rotation signals, and provides a signal to activate a warning indicator 30 to alert the driver when a low tire is detected. A warning reset switch 40 is also represented to deactivate the warning indicator, after service is made for the low tire problem.

Figure 2:
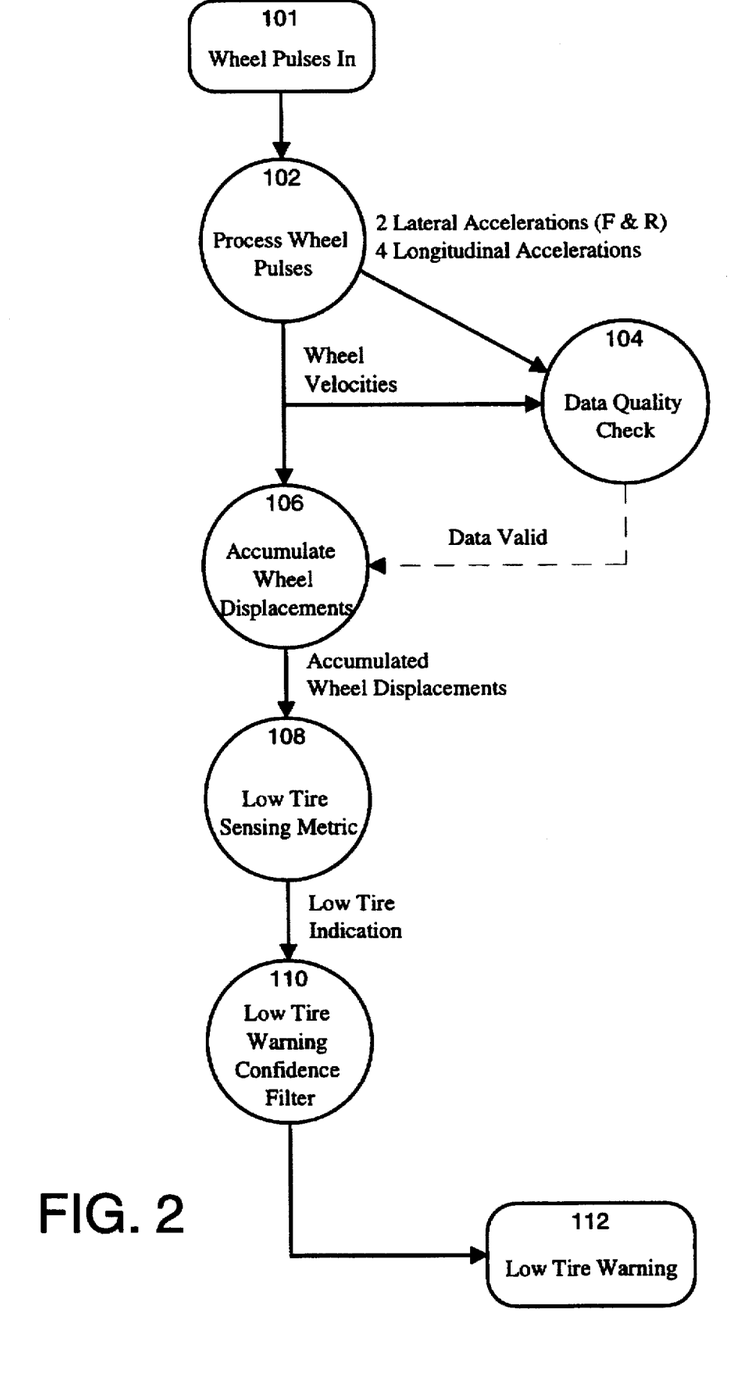
FIG. 2 is an abstract representation of essential data flows in the low tire warning processor.

FIG. 2 presents a high level description of the function of the algorithm which is executed within the low tire warning processor 100 of FIG. 1, and showing essential data flows of the algorithm.

The wheel speed pulses are input at step 101 to a "process wheel pulses" process 102. The zero crossings of these pulses are monitored over a relatively short sampling periods to derive sampling velocity values for each wheel. Those velocity values are then filtered over relatively longer predetermined sampling period to provide estimates of individual wheel velocities. The estimated wheel velocities are further filtered to provide estimates of individual longitudinal wheel accelerations, as well as lateral accelerations for the front pair of wheels and for the rear pair of wheels.

The velocity values and acceleration values are compared against predetermined levels to determine if they are acceptable for further processing, in the "data quality check" process 104. Process 104 determines if the operating conditions of the vehicle are suitable for the system to accept the velocity and acceleration values. If accepted, a "data valid" signal enables an "accumulate wheel displacement" process 106. When enabled, process 106 accepts wheel velocity values for each wheel, determines displacement values and accumulates wheel displacement values until a predetermined distance is determined to have been traveled by any wheel. After collecting valid wheel velocity data over a required distance, the total wheel displacement values are each passed to the "low tire pressure sensing metric" process 108, and the accumulators used in process 106 are zeroed (not shown).

The low tire pressure sensing metric process 108 utilizes a unique algorithm which subtracts the difference of the accumulated displacement values between the rear wheels divided by their mean displacement from the accumulated displacement values between the front wheels divided by their mean displacement. This processing of the individual wheel displacements determines if a low tire pressure condition exists for a tire. The calculated metric is then compared with a predetermined baseline metric to determine an absolute value of a calibrated metric. The absolute value of the calibrated metric is then processed in a "low tire warning confidence filter" process 110.

In process 110, the absolute value of the calibrated metric is compared with a predetermined threshold value which is determined as an acceptable range of values equally above and below the baseline value. This is based on the presumption that the metric must differ sufficiently from the established baseline metric to confirm that the metric value indeed indicates a low tire condition. If the calibrated metric does exceed the predetermined threshold, a low tire condition is determined. That occurrence is then accumulated until there is a sufficient number of such occurrences to provide confidence that a low tire condition has been consistently detected and a warning should be given at process 112.

In process 112, a warning indicator notifies the driver to check the tires. After checking the tires, the tire condition which caused the warning (such as low pressure) should be corrected. That done, the driver or the service technician should reset the system so that the baseline may be updated according to a filtering process that reflects the metric value when tire pressures are deemed acceptable to the driver.

It should be noted that while the sensing metric process of FIG. 2 is described in such a way as to sense a single low tire, it may also be capable of sensing two diagonal low tires, any combination of 3 low tires, and any combination of two low tires as long as the tires do not lose pressure at exactly the same rate. In those instances, the higher the metric's absolute value, the more likely it is that a low tire condition exists.

Figure 3A:
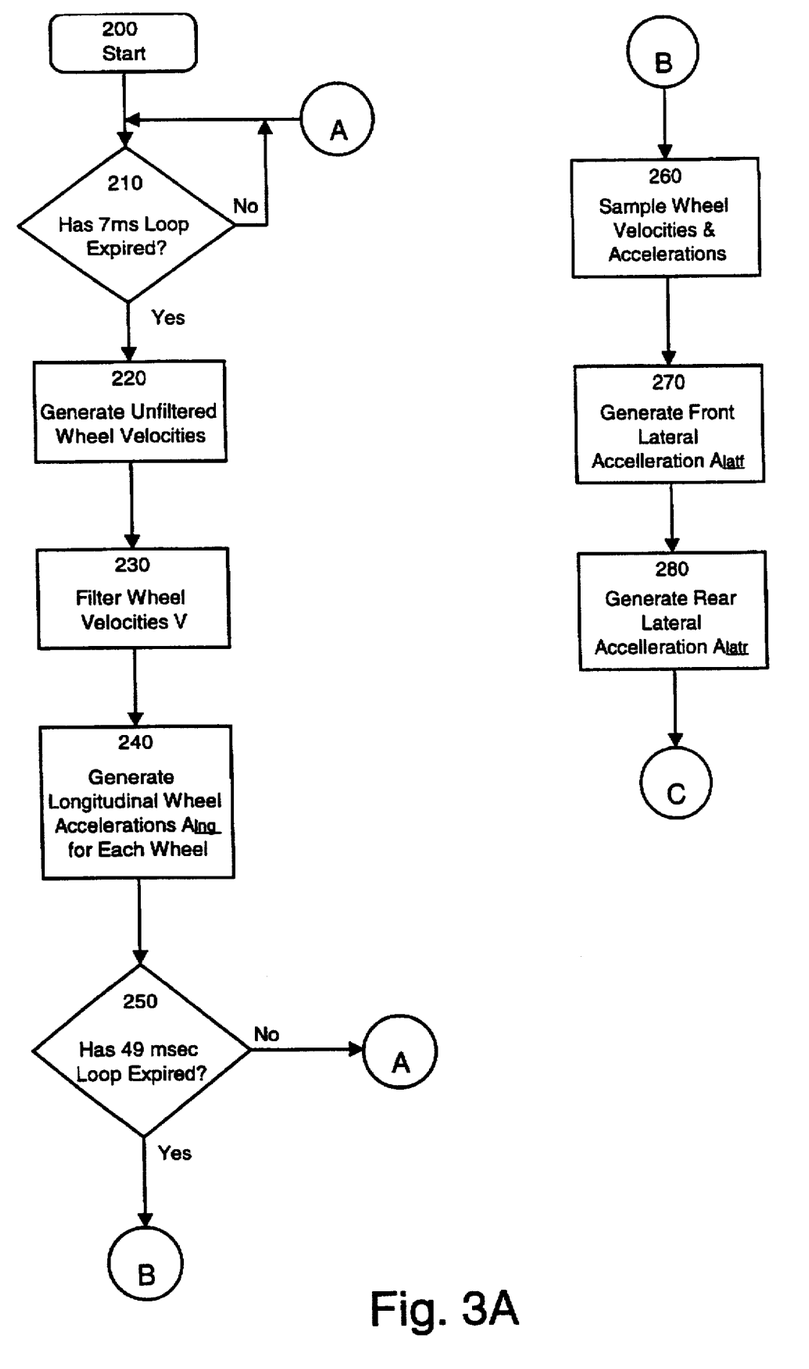
FIG. 3A and FIG. 3B constitute a detailed flow diagram for the preferred embodiment of the algorithm employed in the low tire warning processor.
Figure 3B:
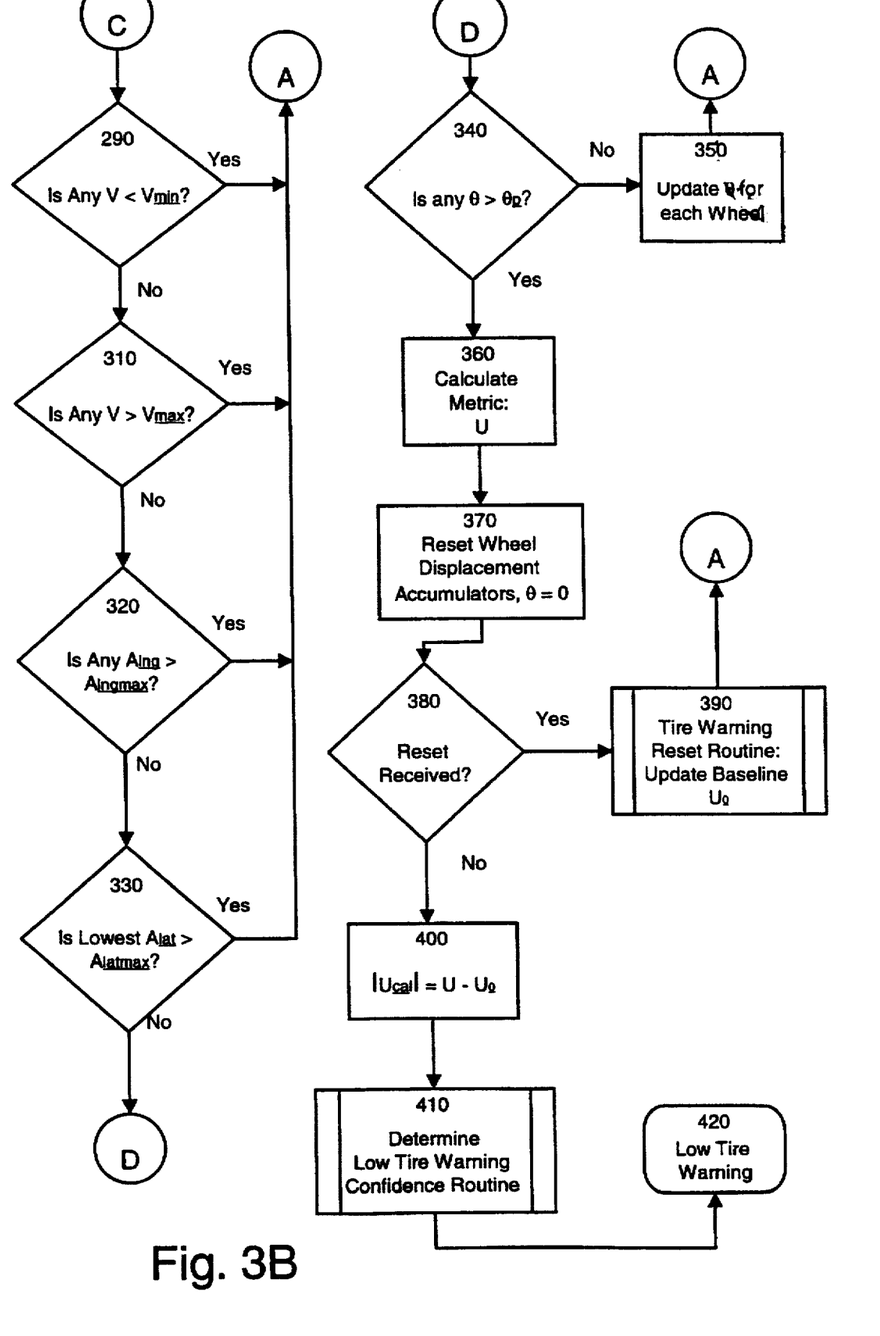

FIGS. 3A and 3B constitute a flowchart which presents a more detailed description of the process which is executed within the low tire warning processor 100 of FIG. 1, and which is summarized in the above description of FIG. 2. (Although not shown, it should be noted that a conventional counter/timer processing unit can be used to process the individual wheel rotation signals from the angular rotation sensors 22, 24, 26 and 28 shown in FIG. 1 and gathered over a relatively short time period. Rotations are sensed by using conventional ABS sensors with "tone rings" emitting typically 100 signal transitions per wheel revolution. In this case, a relatively short time period of 7 msec was selected. Such a processing unit should generate an accumulated zero-crossings signal for each wheel, and an elapsed time signal. This information is in turn gathered by the process of FIG. 3A approximately every 7 msec.)

Following the start 200, a relatively short time period of 7 msec. is established at loop step 210 in which to sample rotational zero-crossing accumulations and generate unfiltered wheel velocity values in step 220. Step 220 can be performed in any conventional manner.

The four unfiltered wheel velocity values are then processed at step 230 every 7 msec. using a digital low pass filtering and scaling technique according to the relationship:

$$Vk = \alpha(Vk-1) + (1-\alpha)(\mu k),$$

wherein

Vk becomes the filtered velocity value for the most recent of k samples (in this case 7 samples in any 49 msec. sampling period);

$\alpha$ is a constant having a value that is less than 1; Vk−1 is the filtered velocity value for the sampling immediately preceding the most recent sampling; and μk is the sensed angular rotation rate for the most recent 7 msec. sampling.

This filtering technique produces a smoothed value for each wheel and is termed as filtered wheel velocity values $V_w$ for each wheel. (i.e., $V_{wfl}$ is the filtered wheel velocity value calculated for the front left wheel; $V_{wfr}$ is for the front right wheel; $V_{wrl}$ is for the rear left wheel; and $V_{wrr}$ is for the rear right wheel.)

In step 240, a high pass filtering technique is used every 7 msec. to generate four longitudinal wheel acceleration signals $A_{lng}$ according to the relationship:

$$A_{lng}k = \delta(A_{lng}k-1) + \beta[Vk - Vk-1],$$

wherein $\delta$ is a constant, less than 1;

$\beta$ is a constant;

Vk is the most recently calculated filtered velocity; Vk−1 is the calculated filtered velocity for the sampling immediately preceding the most recent sampling; and $A_{lng}$ k−1 is the longitudinal acceleration value for the sampling immediately preceding the most recent sampling.

The steps performed at 220, 230 and 240 are repeated until 49 msec has been determined as expired in step 250. When this predetermined sampling period has expired, the filtered velocities and longitudinal acceleration values for each wheel are sampled at step 260 as $V_w$ and $A_{lng}$ values for each of the four wheels.

In step 270, a front lateral acceleration value $A_{latf}$ is generated for the front pair of wheels. In step 280, a rear lateral acceleration value $A_{latr}$ is generated for the rear pair of wheels. For each pair of wheels the respective steps 270 and 280 are performed by using a filter technique according to the relationships:

$$A_{latf} = \kappa(V_{wfl} - V_{wfr})(V_{wfl} + V_{wfr}) \text{ and } A_{latr} = \kappa(V_{wrl} - V_{wrr})(V_{wrl} + V_{wrr}),$$

wherein $\kappa$ is a constant;

$V_{wfl}$, $V_{wfr}$, $V_{wrl}$ and $V_{wrr}$ are as described above.

After the lateral acceleration values have been generated, all the velocity and acceleration values are processed for data quality in steps 290–330 (FIG. 3B).

In step 290, each sampled velocity value $V_{wfl}$, $V_{wfr}$, $V_{wrl}$ and $V_{wrr}$ is compared with a predetermined minimum acceptable velocity value $V_{min}$ to determine if the sampled velocity is at an acceptable level. In this embodiment, $V_{min}$ is selected as approximately 5 mph or 8 kph. If any velocity value is below the minimum acceptable velocity value, the data is rejected and further processing with that data is prevented. However, if all four of the sampled velocity values are higher than the minimum acceptable value, they are then compared against a predetermined maximum acceptable velocity value $V_{max}$ in step 310. In this embodiment, $V_{max}$ is selected as approximately 100 mph (161 kph). If any velocity value is greater than the maximum acceptable velocity value, the data is rejected as unreliable because of the factors discussed above and further processing with that data is prevented.

In step 320, all four of the longitudinal acceleration values $A_{lng}$ are compared with a predetermined maximum acceptable longitudinal acceleration value $A_{lngmax}$. If any of the longitudinal acceleration values $A_{lng}$ are greater than the predetermined maximum acceptable longitudinal acceleration value $A_{lngmax}$, further processing of that data is prevented. This allows further processing only if there is no excessive longitudinal acceleration detected in any wheel, that may be due to braking, slipping or rapid application of wheel torque, as discussed above.

If the longitudinal acceleration data is acceptable, the smallest lateral acceleration value $A_{lat}$ of those generated in step 270 and 280 is compared with a predetermined maximum acceptable lateral acceleration value $A_{latmax}$. The smaller value of $A_{lat}$ is selected for comparison because the occurrence of a low pressure tire will result in one of the two values of $A_{lat}$ to be higher than the other one. Therefore, in order to ensure that data indicative of a low tire will be further processed, it is prudent to validate both values of $A_{lat}$.

Once the data has been validated, the estimated displacement $\theta$ accumulation for each wheel is compared with a predetermined displacement value $\theta_p$. When the accumulated displacement for any wheel exceeds $\theta_p$, a metric is calculated in step 360. However, if the accumulated displacement values for all wheels is below $\theta_p$, the $\theta$ for each wheel is updated in step 350 and more data is collected. In step 350, the displacement values are updated according to the relationship of:

$$\theta = \int V_w(dt),$$

for each wheel.

In step 360, the metric "U" is calculated according to the relationship:

$$U = ((\theta fl - \theta fr)/\overline{\theta fl \theta fr}) - ((\theta rl - \theta rr)/\overline{\theta rl \theta rr}),$$

wherein

θfl is the front left wheel accumulated displacement value,

θfr is the front right wheel accumulated displacement value, $\overline{\theta fl \theta fr}$ is the mean value of θfl and θfr, θrl is the rear left wheel accumulated displacement value, θrr is the rear right wheel accumulated displacement value, and $\overline{\theta rl \theta rr}$ is the mean value of θrl and θrr.

In the metric U, a difference between the displacement values of the paired wheels, is a direct reflection of the difference between effective rolling radii of those wheels and can be attributed to one tire having changed because of loss of air pressure. The metric is selected to accentuate the effect caused by the low pressure tire, by comparing the differences in displacements in each pair of wheels, front and back. If the difference in the effective rolling radii remains unchanged, then the calculated metric will remain low and be of no significance.

After the metric U is calculated, the displacement accumulators are reset to zero in step 370.

In step 380, the process looks to see if a reset signal has been received. As discussed above, such a signal would be provided following service to correct a previously detected low tire condition. In addition, the reset signal may be provided as part of a regular maintenance routine in which all the tires are rotated, any tires are replaced, or any inflation is adjusted. If such a reset signal were detected at step 380, a tire warning reset routine 390 would be performed to update a baseline metric $U_0$ from future metric measurements.

The tire warning reset routine 390 updates a baseline metric value $U_0$ when the tire pressure conditions are thought to be acceptable to the driver or tire mechanic. A reset is requested by activating the warning reset switch 40 in FIG. 1. Although the baseline metric $U_0$ will not be updated immediately, the processor 100 will immediately inhibit the low tire warning indicator 30.

The baseline value $U_0$ is based upon an average value of the tire warning metric U. The particular averaging means may be any of the following: a batch average for a chosen fixed number of metric U updates; a low pass filtered value of metric U updates taken over a fixed chosen time interval; or a low pass filtered value of metric U updates taken over a self-adapting time interval, with the interval period automatically adjusted until a performance criteria on the maximum acceptable variance of $U_0$ is met. The parameters of the selected averaging method are fine-tuned for the particular vehicle and tire combination.

In step 400, the calculated metric U is compared with the predetermined baseline metric $U_0$ to derive an absolute value of the difference. This value is referred to as the calibrated metric $1U_{cal}1$. The calibrated metric is then processed in a low tire warning confidence routine 410, shown in FIG. 4. If the confidence level is determined in routine 410 to be sufficiently high, the low tire warning will be activated in step 420.

Figure 4:
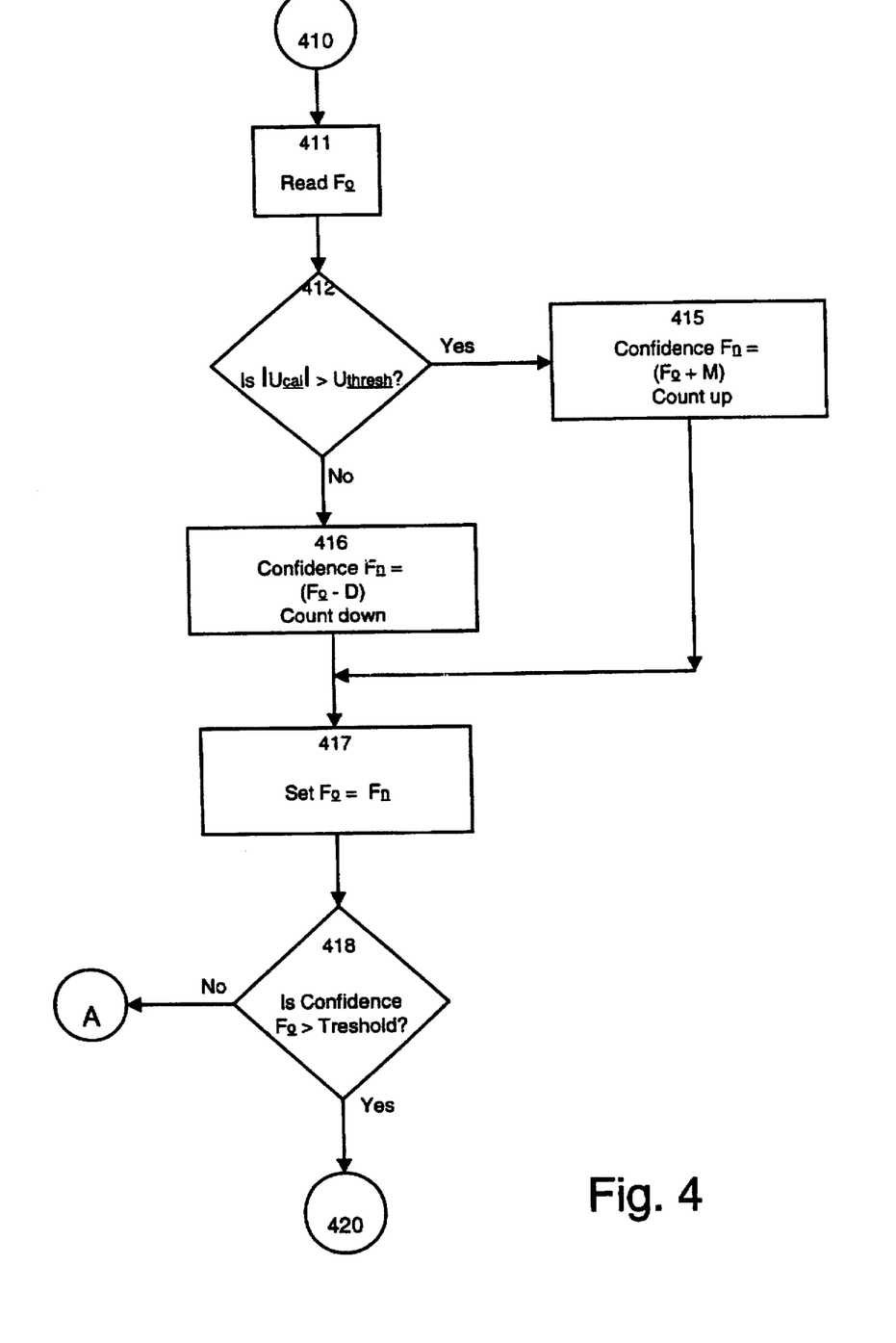
FIG. 4 is a detailed flow diagram of the low tire confidence determination step shown in FIG. 3B.

In FIG. 4, the routine is shown for determining if the calibrated metric $1U_{cal}1$ is sufficient to indicate that a low tire condition is detected, and when a sufficient number of such detections occur to provide assurance that a low tire condition actually exists.

An accumulation of sufficiently high values of $1U_{cal}1$ is made in routine 410 and are represented by a confidence factor $F_o$. At step 411, $F_o$ is read. In step 412, the calibrated metric $1U_{cal}1$ is compared with a predetermined calibrated metric threshold value $U_{thresh}$. If the comparison in step 412 determines that $1U_{cal}1$ exceeds $U_{thresh}$, an updated confidence factor $F_n$ is calculated in step 415 by incrementing the confidence factor $F_o$ read in step 411 by a predetermined increment factor M. In this case, M is and an integer, but may be a constant, or a variable based on conditions selected by one who implements the invention. After step 415, confidence factor $F_o$ is set equal to updated confidence factor $F_n$ in step 417.

In step 416, the updated confidence factor $F_n$ is determined by decrementing the confidence factor $F_o$ by a predetermined decrement factor D, when the calibrated metric $1U_{cal}1$ is determined in step 416 to be below the calibrated metric threshold value $U_{thresh}$. In this case, D is and an integer, but may be a constant, or a variable based on conditions selected by one who implements the invention. In this embodiment, the use of a decrementing step to offset the incrementing step, means that the building of a confidence factor to a predetermined threshold value may take longer, but the confidence in the determination of a low tire condition will be stronger and less likely to give false warnings.

As an alternative to the count down of the confidence factor $F_n$ in step 416, that step can be eliminated in favor of step 415 alone. If the factor M is carefully determined, the appropriate confidence level can be reached.

In step 418, the confidence factor $F_o$ from step 417 is compared with a predetermined confidence threshold to determine if the system has sufficient confidence to provide a warning to the vehicle operator that a low tire condition exists and that service should be performed to correct the condition.

It should be understood that the present invention described herein is illustrative. As such, the terminology used is intended to be in the nature of words of description rather than limitation. It should be further understood that many modifications and variations of the present invention are possible in light of the above teachings. Therefore, it is believed that, within the scope of the appended claims, the present invention may be practiced otherwise than as specifically described.

We claim:

1. A low tire inflation warning system for an automotive vehicle comprising:

a wheel containing a pneumatic tire on both sides of the front of the vehicle;

a wheel containing a pneumatic tire on both sides of the rear of the vehicle;

angular displacement sensors associated with each wheel, to provide output signals corresponding to the rotation of each wheel;

processor means for sampling said output signals of said angular displacement sensors over predetermined time periods to determine the occurrence of a low tire; and warning means that is activated when said processor means indicates the occurrence of a low tire greater than a predetermined threshold number of occurrences;

said processor means is programmed to:
  determine a velocity value for said each wheel, a longitudinal acceleration value for said each wheel, a lateral acceleration value for the front pair of wheels, a lateral acceleration value for the rear pair of wheels, a displacement value for said each wheel, and a metric value based upon a predetermined relationship of an accumulation of displacement values for said each wheel during several sampling periods;
  prevent the determining of the displacement of said each wheel when any velocity value is outside upper and lower predetermined limits;
  prevent the determining of the displacement of said each wheel when any longitudinal acceleration value is above a predetermined maximum limit;
  prevent the determining of the displacement of said each wheel when the smaller of the two said lateral acceleration values is above a predetermined maximum limit; and
  prevent the determining of the metric value until the accumulation of the displacement values for any wheel exceeds a predetermined threshold displacement value.

2. A low tire inflation warning system as in claim 1, wherein said processor means is further programmed to compare each determined metric value with a predetermined base-line metric value and to accumulate each occurrence that comparison results in said each determined metric value differs from said predetermined base-line metric value by a predetermined amount; and to provide an activation signal to said warning means when said accumulated occurrences exceed a second predetermined value.

3. A method of detecting a partially deflated pneumatic tire on a vehicle having a wheel at both sides of the front of the vehicle and a wheel at both sides of the rear of the vehicle, comprising the steps of:
  sensing the angular rotation of each wheel;
  calculating a velocity value of said each wheel according to the sensed angular rotation over several predetermined sampling periods;
  calculating and accumulating displacement values θ for said each wheel over said several predetermined sampling periods;
  calculating a metric value
  $U = ((\theta fl - \theta fr)/\overline{\theta fl \theta fr}) - ((\theta rl - \theta rr)/\overline{\theta rl \theta rr})$ when said displacement values θ for any wheel exceeds a predetermined displacement value, wherein
    θfl is the front left wheel accumulated displacement value,
    θfr is the front right wheel accumulated displacement value,
    $\overline{\theta fl \theta fr}$ is the mean value of the front left wheel accumulated displacement value θfl and the front right wheel accumulated displacement value θfr,
    θrl is the rear left wheel accumulated displacement value,
    θrr is the rear right wheel accumulated displacement value,
    $\overline{\theta rl \theta rr}$ is the mean value of the rear left wheel accumulated displacement value θrl and the rear right wheel accumulated displacement value θrr;
  comparing said calculated metric value with a predetermined metric value;
  accumulating each occurrence that said comparing step results in said calculated metric value differing from said predetermined metric value by at least a predetermined amount; and
  providing an activation signal to a warning means when said accumulated occurrences exceed a predetermined threshold number of occurrences.

4. A method as in claim 3, wherein said accumulating step includes positively accumulating each occurrence that said comparing step results in said calculated metric value differing from said predetermined metric value by at least said predetermined amount and negatively accumulating each occurrence that said comparing step results in said calculated metric value not differing from said predetermined metric value by said at least the predetermined amount; and providing an activation signal to said warning means when the sum of said positively and negatively accumulated occurrences exceeds said predetermined threshold number of occurrences.

5. A method as in claim 3, which further includes the step of providing for inputting a resetting command to deactivate said activation signal after a sensed low tire has been serviced.

6. A method of detecting a partially deflated pneumatic tire on a vehicle having a wheel at both sides of the front of the vehicle and a wheel at both sides of the rear of the vehicle, comprising the steps of:
  sensing the angular rotation of each wheel;
  calculating a velocity value of said each wheel according to the sensed angular rotation over a predetermined sampling period;
  deriving a longitudinal acceleration value of said each wheel over said predetermined sampling period;
  comparing each velocity value with a predetermined minimum acceptable velocity value and a predetermined maximum acceptable velocity value to determine if any velocity value is below the predetermined minimum acceptable velocity value or above the predetermined maximum acceptable velocity value;
  comparing each longitudinal acceleration value with a corresponding predetermined maximum acceptable longitudinal acceleration value to determine if any longitudinal acceleration value is above the corresponding predetermined maximum acceptable longitudinal acceleration value;
  calculating and accumulating displacement values θ for said each wheel over several of said predetermined sampling periods in which said comparing steps indicate velocity values and acceleration values are within acceptable limits;
  calculating a metric value
  $U = ((\theta fl - \theta fr)/\overline{\theta fl \theta fr}) - ((\theta rl - \theta rr)/\overline{\theta rl \theta rr})$ when said displacement values θ for any wheel exceeds a predetermined displacement value, wherein
    θfl is the front left wheel accumulated displacement value,
    θfr is the front right wheel accumulated displacement value,
    $\overline{\theta fl \theta fr}$ is the mean value of the front left wheel accumulated displacement value θfl and the front right wheel accumulated displacement value θfr,
    θrl is the rear left wheel accumulated displacement value,
    θrr is the rear right wheel accumulated displacement value,
    $\overline{\theta rl \theta rr}$ is the mean value of the rear left wheel accumulated displacement value θrl and the rear right wheel accumulated displacement value θrr;

comparing said calculated metric value with a first predetermined metric value;

accumulating each occurrence that said calculating metric comparing step results in said calculated metric value exceeding said first predetermined metric value by at least a predetermined amount; and providing an activation signal to a warning device when said accumulated occurrences exceed a predetermined occurrence value.

7. A method as in claim 6, wherein said accumulating step includes positively accumulating each occurrence that said comparing step results in said calculated metric value differing from said first predetermined metric value and negatively accumulating each occurrence that said comparing step results in said calculated metric value not differing said first predetermined metric value; and providing the activation signal to said warning means when the sum of said positively and negatively accumulated occurrences exceeds said predetermined occurrence value.

8. A method as in claim 6, wherein said step of calculating the velocity value V of said each wheel is performed by using a filter technique according to the relationship:

$$Vk=\alpha(Vk-1)+(1-\alpha)(\mu k),$$

wherein

Vk becomes the filtered velocity value for the most recent of k samples;

$\alpha$ is a constant, less than 1;

Vk-1 is the filtered velocity value for the sampling immediately preceding the most recent sampling; and µk is the sensed angular rotation rate for the most recent sampling.

9. A method as in claim 8, further including the steps of:

deriving a lateral acceleration value of the front pair of wheels over said predetermined sampling period; and deriving a lateral acceleration value of the rear pair of wheels over said predetermined sampling period; and wherein said steps of deriving the lateral acceleration values $A_{lat}$ of each said pair of wheels is performed by using the filter technique according to the relationship:

$$A_{laf}=\kappa(V_{wfl}-V_{wfr})(V_{wfl}+V_{wfr}) \text{ and } A_{lar}=\kappa(V_{wrl}-V_{wrr})(V_{wrl}+V_{wrr}),$$

wherein $\kappa$ is a constant;

$V_{wfr}$ is the velocity value calculated for the front left wheel;

$V_{wfl}$ is the velocity value calculated for the front right wheel;

$V_{wrl}$ is the velocity value calculated for the rear left wheel; and $V_{wrr}$ is the velocity value calculated for the rear right wheel.

10. A method as in claim 6, further including the steps of:

deriving a lateral acceleration value of the front pair of wheels over said predetermined sampling period; and deriving a lateral acceleration value of the rear pair of wheels over said predetermined sampling period; and wherein said steps of deriving the lateral acceleration values $A_{lat}$ of each said pair of wheels is performed by using the a filter technique according to the relationship:

$$A_{laf}=\kappa(V_{wfl}-V_{wfr})(V_{wfl}+V_{wfr}) \text{ and } A_{lar}=\kappa(V_{wrl}-V_{wrr})(V_{wrl}+V_{wrr}),$$

wherein $\kappa$ is a constant;

$V_{wfl}$ is the velocity value calculated for the front left wheel;

$V_{wfr}$ is the velocity value calculated for the front right wheel;

$V_{wrl}$ is the velocity value calculated for the rear left wheel; and $V_{wrr}$ is the velocity value calculated for the rear right wheel.

11. A method as in claim 6, wherein said step of deriving the longitudinal acceleration value $A_{lng}$ of said each wheel is performed by using a filter technique according to the relationship:

$$A_{lng}k=\alpha(A_{lng}k-1)+\beta[Vk-Vk-1],$$

wherein $\alpha$ is a constant, less than 1;

$\beta$ is a constant;

Vk is the most recently calculated velocity for the most recent of k samplings of sensed angular rotation rate of several samplings that occur during the predetermined sampling period;

Vk-1 is the calculated velocity for the sampling of sensed angular rotation rate immediately preceding the most recent sampling; and $A_{lng}$ k-1 is the longitudinal acceleration derived from the calculated velocity immediately preceding the most recently calculated velocity.

12. A method as in claim 6, further including the step of comparing the smaller value of the derived lateral acceleration values of the front pair and rear pair of wheels with a predetermined maximum acceptable lateral acceleration value prior to said step of calculating and accumulating displacement values.

13. A method of detecting a partially deflated pneumatic tire on a vehicle having a wheel at both sides of the front of the vehicle and a wheel at both sides of the rear of the vehicle, comprising the steps of:

sensing the rotation of each wheel;

sampling said sensed rotation of said each wheel over predetermined time periods to determine the occurrence of a low tire; and warning the vehicle operator when said step of sampling indicates the occurrence of a low tire over a predetermined threshold number of occurrences; and said sampling step includes the steps of;

determining a velocity value for said each wheel, a longitudinal acceleration value for said each wheel, a lateral acceleration value for the front pair of wheels, a lateral acceleration value for the rear pair of wheels, a displacement value for said each wheel, and a metric value based upon a predetermined relationship of an accumulation of displacement values for said each wheel during several sampling periods;

preventing the determining of the displacement value of said each wheel when any velocity value is outside upper and lower predetermined limits;

preventing the determining of the displacement value of said each wheel when any longitudinal acceleration value is above a predetermined maximum limit;

preventing the determining of the displacement value of said each wheel when the smaller of lateral acceleration values is above a predetermined maximum limit; and preventing the determining of the metric value until the accumulation of the displacement values for any wheel exceeds a predetermined threshold displacement value.

14. A method as in claim 13, wherein said sampling step further includes the steps of comparing each determined metric value with a predetermined base-line metric value and accumulating each occurrence that comparing results in said metric value differing from said predetermined base-line metric value by at least a predetermined amount; and to provide a warning when said accumulated occurrences exceed a predetermined threshold number of occrrences.

* * * * *